C. G. FINK.
FRACTIONAL DISTILLATION OF METALS.
APPLICATION FILED FEB. 7, 1908.
996,474.
Patented June 27, 1911.
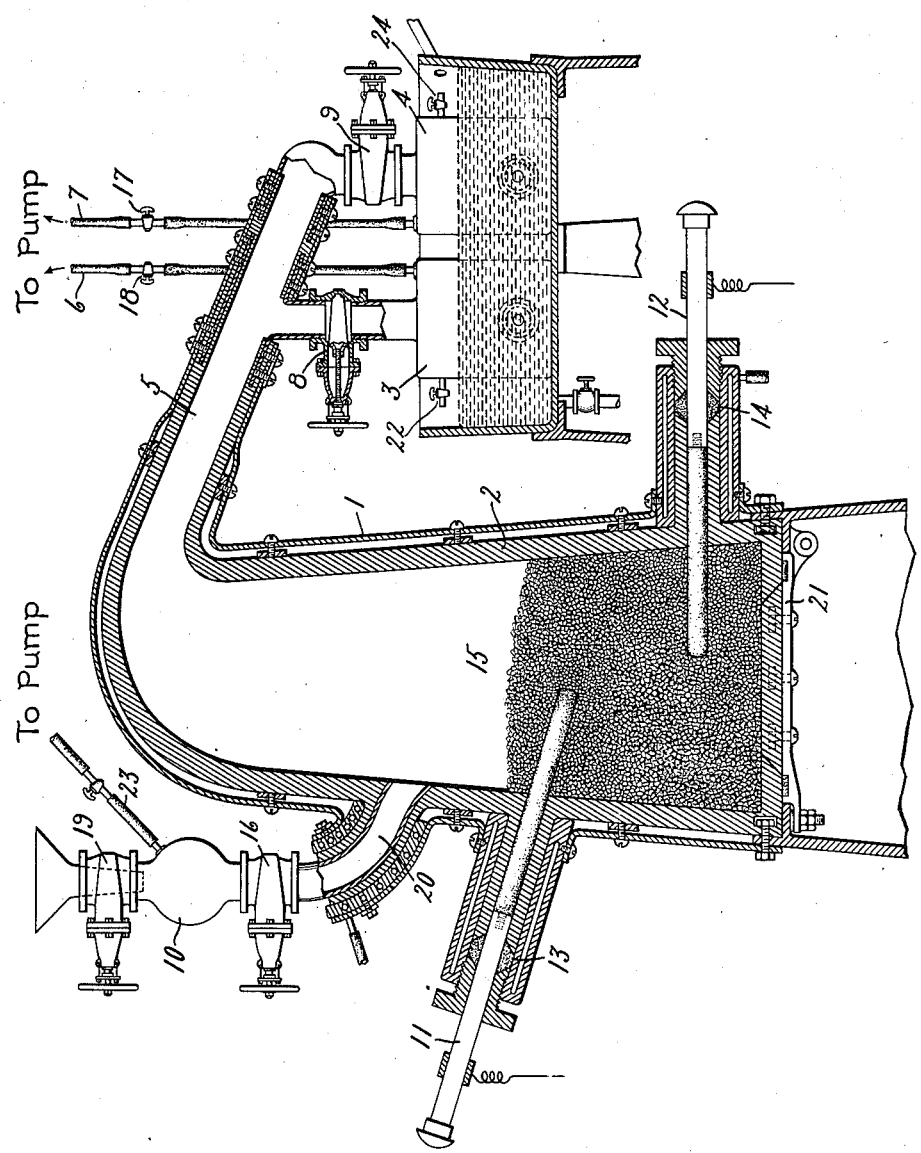
Witnesses:
George N. Tilden
J. Ellis Glen
Inventor:
Colin G. Fink,
by Albert G. Davis
Att'y.

UNITED STATES PATENT OFFICE.

COLIN G. FINK, OF SCHENECTADY, NEW YORK, ASSIGNOR TO GENERAL ELECTRIC COMPANY, A CORPORATION OF NEW YORK.

FRACTIONAL DISTILLATION OF METALS.

996,474.    Specification of Letters Patent.    Patented June 27, 1911.

Application filed February 7, 1908. Serial No. 414,683.

*To all whom it may concern:*

Be it known that I, COLIN G. FINK, a citizen of the United States, residing at Schenectady, county of Schenectady, State of New York, have invented certain new and useful Improvements in Fractional Distillation of Metals, of which the following is a specification.

This invention comprises certain improvements in the treatment of ores so as to effect a reduction of the ore and a purification of the product in one continuous operation.

My procedure is applicable to a variety of ores, but in general to ores which contain volatilizable substances, for example, as antimony and arsenic. The metallurgical treatment of ores of this kind is at present accomplished by a long and expensive process. By taking advantage of the lowered temperature of vaporization of substances in a vacuum not only are the methods of treatment simplified, but a better yield and purer product is obtained. Furthermore, low grade ores may be used which formerly could not be worked to advantage.

The novel features of my invention are pointed out in the appended claims.

A detailed description of procedure with certain ores will be given to illustrate the general nature of my invention.

The accompanying drawing shows a resistance furnace, together with means for operating the furnace continuously and maintaining a vacuum in the same.

As an illustration of my invention the treatment of stibnite, an ore of antimony, may be described. This is a sulfid of antimony having the chemical formula $Sb_2S_3$. It is a soft grayish mineral with a metallic luster. The recovery of antimony from stibnite is at present accomplished by a series of separate steps, such as concentration, volatilization, oxidation and reduction.

A temperature of 1500–1700° C. is necessary to vaporize antimony at atmospheric pressure. It is because of this high temperature that a distillation of the metal from the slag after reduction of the metal is not feasible. The output is impure and the loss of metal is considerable under atmospheric pressure. However, at a pressure of 5–6 m. m. of mercury, antimony vaporizes at 735° C. This very much lower temperature makes it possible to combine with the process of reduction a process of distillation, which combination results in an almost quantitative yield and a purer product. I mention this fact to show how greatly the temperature of distillation is lowered by a high degree of evacuation. Practically, I have not found it necessary to attain this high degree of evacuation in order to carry out my process. At a pressure of about 40 m. m. of mercury, the antimony will be readily distilled at a temperature in the neighborhood of 1200–1300° C. As no precise degree of evacuation need be attained no more exact temperatures need be given.

As is evident, all loss of metal due to "burning" or oxidation is avoided. Another advantage of the vacuum process is the greater speed of the reaction, due to the fact that the gaseous products are quickly removed during the reduction.

According to one mode of carrying out my invention with stibnite using an ore containing 62% of antimony, 11.3 parts of stibnite, 12 parts of limestone, 2½ parts of coke and 6 parts of fluorspar are ground until the resulting powder will pass through a 20 mesh-sieve, and the mass is intimately mixed and then treated in the furnace as hereafter described. The calcium of the limestone serves to combine with the sulfur of the ore. The carbon dioxid gas liberated from the limestone is reduced to the monoxid by the carbon of the charge and of the electrodes. The carbon dioxid and monoxid gases serve to make the charge porous and assist mechanically in the extraction and distillation of the reduced antimony. It is possible that the carbon monoxid likewise furthers the reduction process. The carbon also serves the purpose of increasing the conductivity of the charge, so as to enable a current to be passed through the charge in order to heat the same. The fluorspar seems to facilitate the separation of the antimony from the slag during the distillation which is later described.

The powdered mixture of ore is placed in a furnace such as shown in the drawing. The furnace walls 1 are made of metal, such as iron. The furnace is lined with a refractory material such as fire brick. Care must be taken to make all the joints and parts of the furnace air-tight. The furnace is provided with interchangeable water-cooled condensing chambers 3 and 4, communicating with the furnace by means of a conduit 5. An exhaust pump communicates with the charging chambers by tubes 6 and 7. As the condensing chambers communicate with the furnace, the pump will exhaust the furnace as well as the chambers. By closing cock 8 condensing chamber 3 is cut out, by closing cock 9 condensing chamber 4 is cut out. Either chamber may thus be cut out in order to remove its contents, the antimony being in the meantime received in the other chamber. Charging chamber 10 permits ore to be introduced into the chamber without interrupting its operation, as will be further explained. Electrodes 11 and 12 pierce the furnace wall through air-tight, water-cooled packings 13 and 14. The charge is placed within the chamber 15 in contact with electrodes 11 and 12, and a current is passed through the charge. Valves 9 and 16 are closed and valve 8 is opened. Condensing chamber 3 is thus put into communication with the furnace. The valve 17 to the pump is closed, and the valve 18 to the pump is opened. The pump is put into operation. The heating is performed in two stages. The temperature is gradually raised to 600–700° C. and maintained at that point for one and a half hours, the pump being in constant operation. According to my present belief the following action takes place:

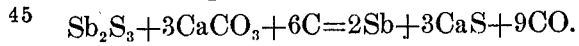

$$Sb_2S_3 + 3CaCO_3 + 6C = 2Sb + 3CaS + 9CO.$$

The fact that calcium sulfid, CaS, is formed in the slag, and CO gas is given off during the operation makes it reasonable to suppose that this reaction takes place. The constant operation of the pump will maintain a vacuum of about 40 m. m. in the furnace. The current is now slowly increased until a temperature of about 1300° is obtained and continued at this point for about one hour, the vacuum pump operating continuously. During this stage of process the antimony is distilled from the mixture into the chamber 3. The chamber 3, being water-cooled, serves as a condensing chamber, the antimony assuming the solid state. A fresh charge of ore is meanwhile fed into the chamber 10, through the valve 19, through a funnel or other means, the valve 16 leading to the furnace remaining closed. The outer valve 19 is now closed, and the valve 16 opened.

The charge drops through the chute 20 into the furnace. The operation of the pump is interrupted by closing cocks 8 and 18 for a short time, or until the gases liberated by the charge have accumulated (indicated by the pressure gage) to an extent sufficient to allow the slag to be removed. A pressure of three-fourths of an atmosphere inside the furnace will be sufficient. During this interval no antimony is volatilized. The impoverished charge can be removed by lowering the hinged bottom 21 after the furnace has partly cooled and filled with air. The pump is then again set into operation, cock 18 is opened, and after a short time cock 8, until the desired degree of evacuation is restored by the pump. By this means the operation of the furnace is continuous. As the slag need not be removed after each fresh charging, the vacuum may be continuously maintained for a long time. The charging chamber 10 is connected to the pump through the tube 23. If necessary chamber 10 is evacuated before opening the valve 16 so as not to impair the vacuum in the furnace when introducing a fresh charge.

The distilled antimony is removed from the chamber 3 when a sufficient amount has accumulated, the chamber 3 being cut out by closing cocks 8 and 18. Chamber 4 is cut in by opening cocks 9 and 17 and serves to receive the distilled ore. Air is admitted into the condensing chamber before emptying the same by means of cock 22, in order to destroy the vacuum. The chamber 3 may then be opened and the charge removed. Chamber 4 is similarly provided with a cock 24. The slag consists mainly of calcium sulfid with less than 1% of antimony. The reduced antimony is 99% pure.

The reduction of the stibnite may also be accomplished by heating the powdered ore with finely divided metallic iron. Two parts by weight of stibnite are mixed with one of iron. The temperature of the charge is raised 700° for 20 minutes. During this time reduction takes place with the formation of iron sulfid and metallic antimony. It is my opinion that the following reaction takes place:

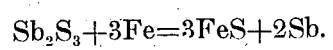

$$Sb_2S_3 + 3Fe = 3FeS + 2Sb.$$

The temperature is then carried to 1200–1300° C. and held at this point for about one hour. At this temperature the antimony will be distilled away from the sulfid of iron. The output is practically quantitative, only slight traces of antimony being retained by the iron sulfid. The product of metallic antimony is well crystallized. The crystals are of a very bright luster. The slag is a fine granular mass of iron sulfid.

Instead of metallic iron, an oxid ore such as hematite, limonite, magnetite, and so forth may be used, the oxygen of the hematite serving partly to unite with the sulfur of the stibnite to form sulfur dioxid $SO_2$, and the remaining sulfur combining with the reduced iron to form sulfid of iron. This sulfur dioxid is a valuable by-product. From 2 to 3 parts by weight of powdered carbon to one part of ore is added to the charge. This addition increases the conductivity of the charge, and by forming carbon monoxid keeps the charge porous and assists in the distillation of the antimony.

Instead of an iron ore, a chrome iron ore, as for example, chromite can be used. Chromite is a brittle, iron-black mineral of the chemical composition expressed by the formula $FeOCr_2O_3$. For example, about four parts of finely ground stibnite are mixed with two parts of finely ground chrome iron ore. One part by weight of powdered coke or charcoal is added for the same purposes as set forth above in connection with the iron ore. The powdered mass should be fine enough to pass through a 20 mesh sieve. The mixture is heated in two stages. It is first heated at 900° for one to two hours to effect the reduction of the antimony, iron and chromium. Part of the antimony is volatilized at this temperature. It is my belief that the reduction takes place essentially according to one or both of the following equations:

$$3FeCr_2O_4 + Sb_2S_3 + 12C = 3FeS + 12CO + 2Sb + 6Cr.$$
$$2FeCr_2O_4 + Sb_2S_3 + 6C = 2FeS + SO_2 + 6CO + 2Sb + 4Cr.$$

But I do not wish to be limited by this view. The temperature is now raised to about 1500° for one to two hours in order to volatilize out the remaining reduced antimony. A very pure product and a practically quantitative yield are obtained. The product in the lower part of the furnace is chrome-iron and slag. Removal of the slag and reduced metal and re-charging of the furnace may be accomplished in the same manner as in connection with the lime process heretofore described, thus making the operation of the furnace continuous.

Both the lime method, iron method and a chrome-iron method of reduction can be applied to stibnite ranging as low as 34% antimony and good results can be obtained. This method of fractional distillation in a vacuum can be applied to the so-called electrolytic slimes which contain a volatilizable metal such as antimony. Very pure antimony can be obtained by this method from a slime containing 35% of antimony, the yield being almost 95%.

I have described these methods of obtaining metallic antimony at length to make clear my invention, but my process is not confined to the treatment of antimony ores.

In the case of some ores the addition of a reducing agent is not necessary. The heat treatment alone may be sufficient to bring about a separation or dissociation of the elements, and has thus the same effect as a reduction. Elements other than antimony may thus be recovered. Both of these features are illustrated by the following example. Smaltite, a cobalt arsenid, $CoAs_2$, may be reduced by this process. The ore usually contains a certain amount of sulfur and iron, and the cobalt is often replaced to some extent by nickel. Smaltite is a tin-white, brittle mineral. By subjecting this ore to a distillation process both metallic arsenic and an alloy of cobalt iron and nickel may be produced.

What I claim as new and desire to secure by Letters Patent of the United States, is,—

1. The process of reducing the sulfid compound of a volatilizable metal which consists in mixing said compound with a reaction material which will combine with the sulfur at an elevated temperature to form a relatively stable compound, heating said mixture to the reaction temperature and then removing the reduced metal from the by-products of the reaction by distillation in an attenuated atmosphere.

2. The process which consists in mixing antimony ores with a reaction material yielding reducing gases and a basic compound having an affinity for the non-metallic constituent of the ore and distilling off the antimony at an elevated temperature and at a reduced pressure.

3. The process which consists in heating a mixture of sulfid of antimony, lime and carbon and removing the gaseous reaction products and distilling the reduced antimony in an attenuated temperature.

4. The process which consists in heating a mixture of sulfid of antimony, lime and carbon to a temperature of about 600 to 700° C., removing the gaseous reaction products and distilling the reduced antimony at a temperature of about 1300° C. in an attenuated atmosphere.

5. The process which consists in reducing an antimony compound in the presence of reaction material forming a slag with a non-metallic compound of said compound, which is more refractory than antimony and volatilizing and conducting away the reduced antimony from the slag, all in a highly attenuated atmosphere.

6. The process which consists in heating a reaction mixture containing a volatilizable metal to the reduction temperature in a substantial vacuum, and maintaining said temperature to complete the reduction, then increasing the temperature to the volatilizing point of said metal and conducting away and condensing the reduced metal.

7. The process which consists in heating antimony sulfid in the presence of a reducing agent at a temperature of about 600 to 700° C. while maintaining a substantial vacuum over the reaction mass, and finally distilling the reduced antimony at a higher temperature in said vacuum.

In witness whereof, I have hereunto set my hand this 5th day of Feb., 1908.

COLIN G. FINK.

Witnesses:
HELEN ORFORD,
BENJAMIN B. HULL.